(12) United States Patent
Lin

(10) Patent No.: US 9,604,330 B2
(45) Date of Patent: Mar. 28, 2017

(54) POSITIONING BLOCK STRUCTURE FOR MACHINING FIXTURE

(71) Applicant: JIA SIN PRECISION CO., LTD., Changhua, Changhua County (TW)

(72) Inventor: Jian Sin Lin, Changhua (TW)

(73) Assignee: Jia Sin Precision Co., Ltd., Changhua (TW)

( * ) Notice: Subject to any disclaimer, the term of this patent is extended or adjusted under 35 U.S.C. 154(b) by 0 days.

(21) Appl. No.: 14/645,474

(22) Filed: Mar. 12, 2015

(65) Prior Publication Data

US 2016/0263716 A1    Sep. 15, 2016

(51) Int. Cl.
*B23Q 3/10* (2006.01)
*B23Q 1/00* (2006.01)

(52) U.S. Cl.
CPC .................. *B23Q 1/0072* (2013.01)

(58) Field of Classification Search
CPC .... B23Q 1/0072; B23Q 1/009; B23Q 1/0081; B23Q 1/0063; B23Q 3/18; B23Q 3/183; B23Q 3/186
USPC .............. 269/309; 108/57.29, 57.31, 57.33; 248/562, 621, 635; 267/137, 140.11
See application file for complete search history.

(56) References Cited

U.S. PATENT DOCUMENTS

| | | | | |
|---|---|---|---|---|
| 4,610,020 A * | 9/1986 | La Fiandra | ............... | B23Q 3/08 250/491.1 |
| 4,838,533 A * | 6/1989 | Buchler | ................ | B23Q 16/08 269/310 |
| 5,174,540 A * | 12/1992 | Gilliam | ..................... | F16F 1/54 248/635 |
| 6,036,198 A * | 3/2000 | Kramer | .................... | B23H 7/26 219/69.15 |
| 6,089,557 A * | 7/2000 | Obrist | .................. | B23Q 1/0081 269/309 |
| 6,336,767 B1 * | 1/2002 | Nordquist | ................ | B23H 7/26 403/282 |
| 6,609,851 B2 * | 8/2003 | Nordquist | ................ | B23H 7/26 269/309 |
| 7,367,552 B2 * | 5/2008 | Greber | .................... | B23H 7/26 269/309 |

(Continued)

FOREIGN PATENT DOCUMENTS

CH         CA 2501113 A1 * 10/2005     ............. B23B 1/103

*Primary Examiner* — Joseph J Hail
*Assistant Examiner* — Marc Carlson
(74) *Attorney, Agent, or Firm* — Alan D. Kamrath; Kamrath IP Lawfirm, P.A.

(57) ABSTRACT

A machining fixture contains: a base, a plurality of positioning blocks, and a workpiece holder. The base includes a first connecting face on which plural fixing slots are arranged, and each fixing slot has a threaded hole. Each positioning block includes an affix portion and a fixation portion having two symmetrical contacting faces and two flexible portions. Each positioning block further includes a mounting hole or blind aperture defined on a middle section thereof and passing through the affix portion from the fixation portion. A screw bolt is screwed with the threaded hole of each fixing slot via the a mounting hole or blind aperture, and the affix portion of each positioning block enters into and contacts with each fixing slot of the base. The workpiece holder includes a second connecting face on which plural locating slots are arranged.

7 Claims, 9 Drawing Sheets

(56) References Cited

U.S. PATENT DOCUMENTS

| | | | | |
|---|---|---|---|---|
| 8,308,169 B2* | 11/2012 | Dahlquist | ............... | B23B 31/02 |
| | | | | 279/126 |
| 8,413,973 B2* | 4/2013 | Sandmeier | ........... | B23Q 1/0072 |
| | | | | 269/289 R |
| 2006/0113732 A1* | 6/2006 | Hediger | ............... | B23Q 1/0072 |
| | | | | 279/19.3 |
| 2007/0293098 A1* | 12/2007 | Hsieh | ................... | B23Q 1/0072 |
| | | | | 439/736 |
| 2010/0019428 A1* | 1/2010 | Sandmeier | ............. | B23Q 16/00 |
| | | | | 269/168 |

* cited by examiner

POSITIONING BLOCK STRUCTURE FOR MACHINING FIXTURE

BACKGROUND OF THE INVENTION

Field of the Invention

The present invention relates to a fixture for a machine and, more particularly, to a positioning block structure for a machining fixture which obtains machining precision and prolongs using lifespans.

Description of the Prior Art

Conventional machining fixtures are designed to satisfy various machining requirements. For example, a common machining fixture contains a base and a workpiece holder. The base is mounted on a machine, and the workpiece holder is applied to position a workpiece which will be machined. The workpiece holder is connected with or removed from the base, such that after the workpiece is machined, it is removed from the base with the workpiece which is machined. Thereafter, another workpiece holder, on which anther workpiece is mounted, is fixed on the machine, thus decreasing replacement waiting time and increasing machining efficiency. To connect the workpiece holder on the base quickly, a structure is configured between the base of the machining fixture and the workpiece holder. Generally speaking, a plurality of positioning blocks is symmetrically arranged on the base, and plural mounting grooves are defined on the workpiece holder for engaging with the plurality of positioning blocks, thus aligning the plurality of positioning blocks with the plural mounting grooves accurately.

Figure 11:
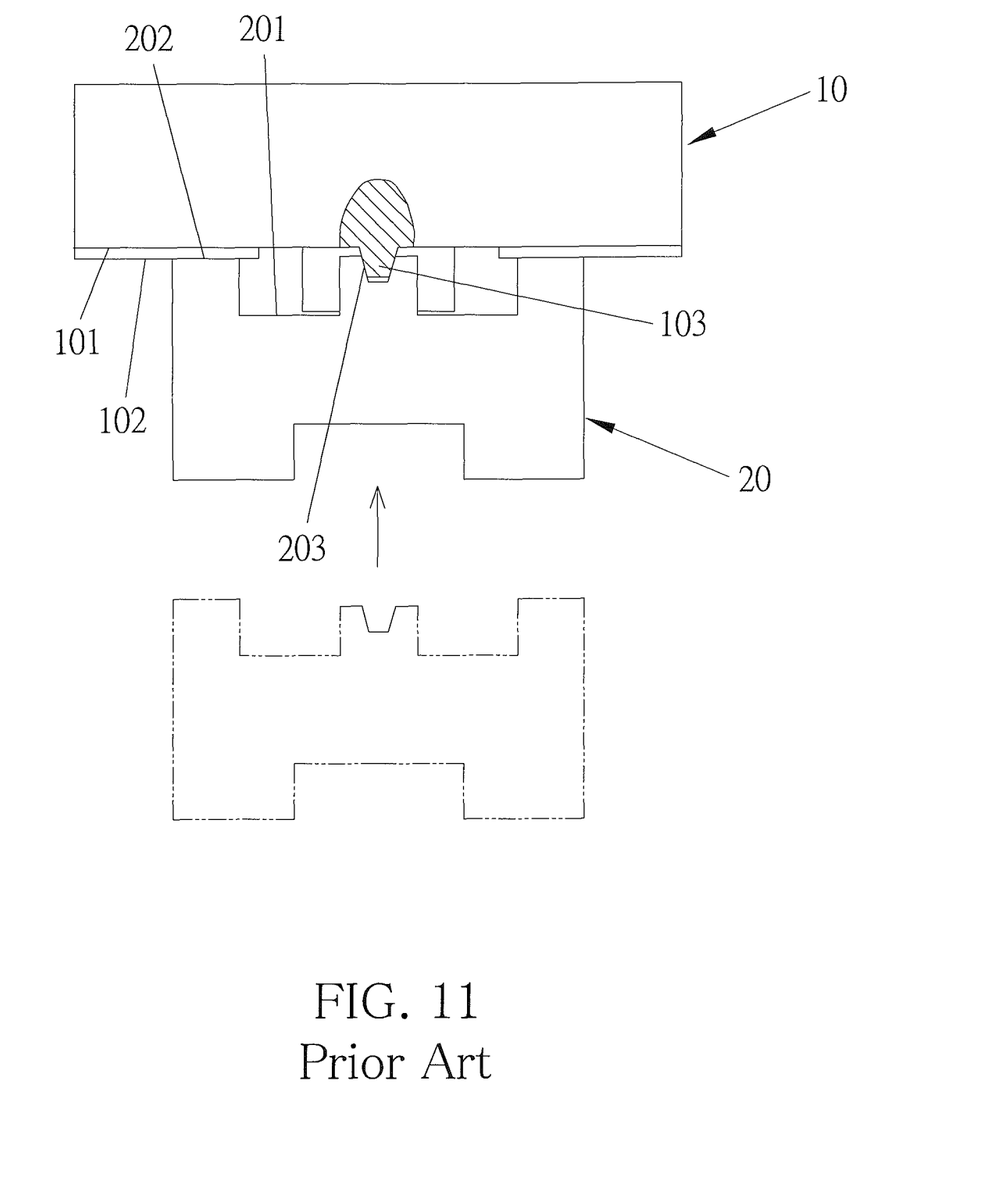
FIG. 11 is a cross sectional view showing the operation of a part of a conventional machining fixture.

With reference to FIG. 11, a conventional machining fixture contains a base 10 and a workpiece holder 20. The base 10 includes a first connecting face 101 on which plural first fixing faces 102 and plural positioning blocks 103 are formed. Each positioning block 103 is one-piece formed on the first connecting face 101. The workpiece holder 20 is connected with or removed from the base 10 and includes a second connecting face 201 on which plural second fixing faces 202 and plural fixing slots 203 are defined. When the workpiece holder 20 is in connection with the base 10, the plural second fixing faces 202 contact with the plural first fixing faces 102 of the base 10, and the plural fixing slots 203 engage with the plural positioning blocks 103 of the base 10, thus connecting the workpiece holder 20 with the base 10 accurately. However, the plural positioning blocks 103 are one-piece formed on the base 10 to cause difficult machining and high production costs.

Figure 12:
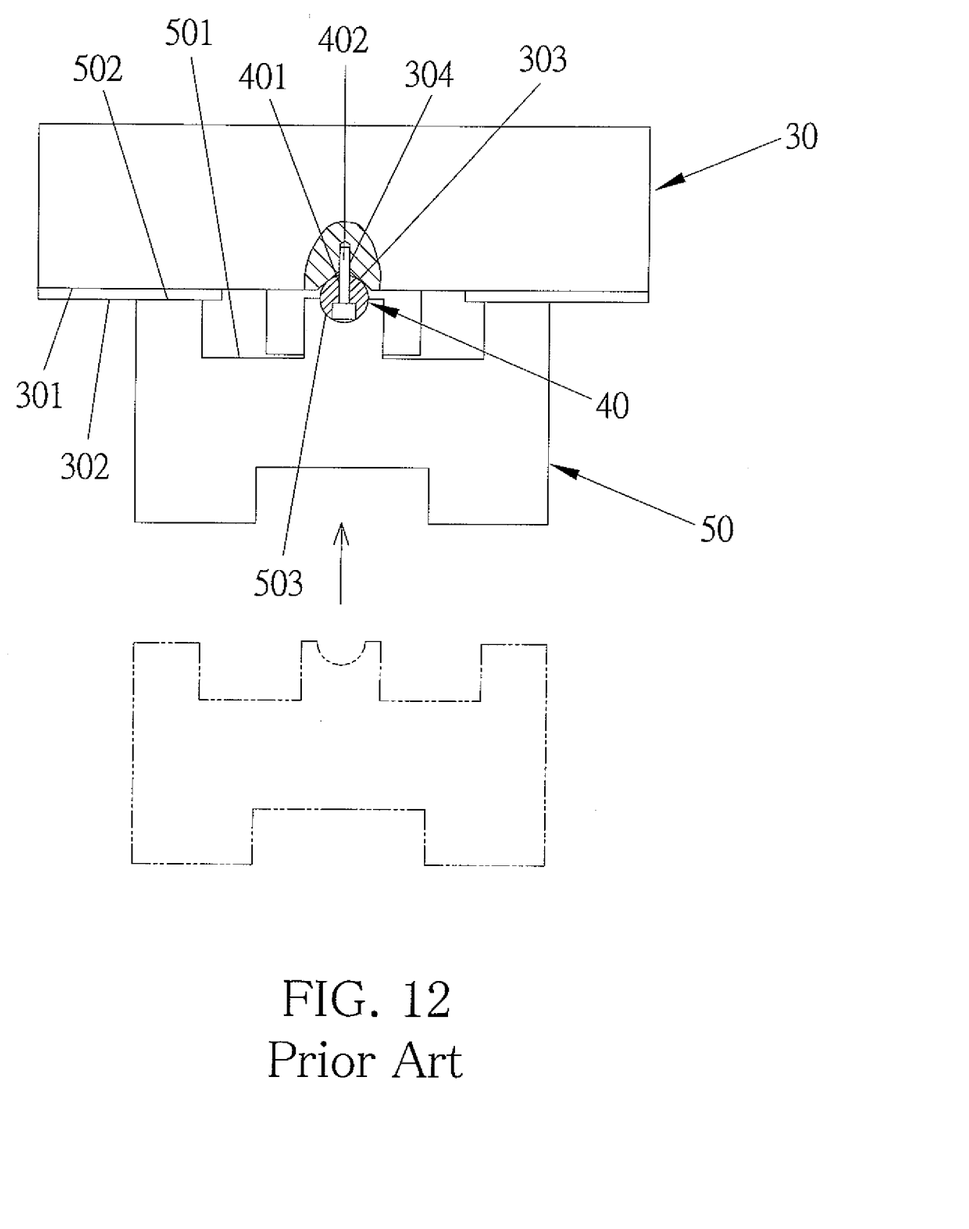
FIG. 12 is a cross sectional view showing the operation of a part of another conventional machining fixture.

Referring further to FIG. 12, a fixture for electrical discharge machining contains a base 30, a plurality of positioning blocks 40, and a workpiece holder 50. The base 30 includes a first connecting face 301 on which plural first fixing faces 302 and plural tapered fixing slots 303 are formed. Each tapered fixing slot 303 has a threaded hole 304 defined on a bottom end thereof. Since each positioning block 40 is an independent component, it is manufactured difficultly at a high cost. Each positioning block 40 is a circular bar or in a strap shape and has a through orifice 401 formed on a middle section thereof. A screw bolt 402 is screwed with the threaded hole 304 of each tapered fixing slot 303 of the base 30 via the through orifice 401 of each positioning block 40, such that each positioning block 40 enters into and contacts with each tapered fixing slot 303. The workpiece holder 50 is connected with or removed from the base 30 and includes a second connecting face 501 on which plural second fixing faces 502 and plural locating slots 503 are arranged. When the workpiece holder 50 is connected with the base 30, the plural second fixing faces 502 contact with the plural first fixing faces 302 of the base 30, and the plural locating slots 503 engage with the plurality of positioning blocks 40 on the base 30, thus connecting the workpiece holder 50 with the base 30 exactly. Nevertheless, the plural first fixing faces 302 of the base 30 and the plural second fixing faces 502 of the workpiece holder 50 are broken or worn easily in a machining process to cause a rough surface. Thus, the base 30 and the workpiece holder 50 are trimmed flatly, and a height of each first fixing face 302 of the base 30 and each second fixing face 502 of the workpiece holder 50 is reduced. Accordingly, when each locating slot 503 of the workpiece holder 50 engages with each positioning block 40 on the base 30, each second fixing face 502 does not contact with each first fixing faces 302 of the base 30 completely (i.e., a gap generates between each second fixing face 502 and each first fixing faces 302), the workpiece holder 50 does not connect with the base 30 stably, and a machining precision of the machine and a lifespan of the machining fixture decrease.

The present invention has arisen to mitigate and/or obviate the afore-described disadvantages.

SUMMARY OF THE INVENTION

The primary objective of the present invention is to provide a positioning block structure for a machining fixture so that when plural first fixing faces of a base and plural second fixing faces of a workpiece holder are broken or worn in a machining process, they are trimmed flatly, so a height of each first fixing face of the base and each second fixing face of the workpiece holder decreases. Two symmetrical contacting faces of a fixation portion of each positioning block flexibly press and deform inward, and the fixation portion of each positioning block moves into each locating slot of the workpiece holder to offset the height of each first fixing face of the base and each second fixing face of the workpiece holder which decreases. Hence, a gap between each second fixing face of the workpiece holder and each first fixing face of the base is avoided, thus fixing the workpiece holder with the base accurately to enhance machining precision and to prolong a lifespan of the machining fixture.

Another objective of the present invention is to provide a positioning block structure for a machining fixture so that when environmental factors (such as temperature change, various machines, and machining error) occur to cause a positioning error between the workpiece holder and the base, the two symmetrical contacting faces of the fixation portion of each positioning block flexibly press and deform inward to automatically adjust an engaging depth between each positioning block and each locating slot of the workpiece holder, thus obtaining positioning precision.

To obtain above-mentioned objectives, a positioning block structure for a machining fixture provided by the present invention contains: a base, a plurality of positioning blocks, and a workpiece holder.

The base includes a first connecting face on which plural fixing slots are arranged, and each fixing slot has a threaded hole defined on a bottom end thereof.

Each positioning block is an elongated protrusion and includes tapered affix portion and a fixation portion opposite to the tapered affix portion. The fixation portion has two symmetrical contacting faces defined on two sides thereof and has two flexible portions defined in the two symmetrical contacting faces. The two symmetrical contacting faces flexibly press and deform inward by ways of the two symmetrically recesses. Each positioning block further includes a mounting hole or blind aperture defined on a middle section thereof and passing through the tapered affix portion from the fixation portion. A screw bolt is screwed with the threaded hole of each fixing slot of the base via the mounting hole or blind aperture, and the tapered affix portion of each positioning block enters into and contacts with each fixing slot of the base.

The workpiece holder is connected with or removed from the base, and the workpiece holder includes a second connecting face on which plural locating slots are arranged. When the workpiece holder is connected with the base, each locating slot engages with the fixation portion of each positioning block on the base.

DETAILED DESCRIPTION OF THE PREFERRED EMBODIMENTS

The present invention will be clearer from the following description when viewed together with the accompanying drawings, which show, for purpose of illustration only, preferred embodiments in accordance with the present invention.

With reference to FIGS. 1 to 6, a machining fixture, according to a first embodiment of the present invention, comprises: a base 1, a plurality of positioning blocks 2, and a workpiece holder 3. The base 1 includes a first connecting face 11 on which plural first fixing faces 12 and plural tapered fixing slots 13 are arranged. The plural first fixing faces 12 and plural tapered fixing slots 13 are crisscross arranged on the first connecting face 11. Each tapered fixing slot 13 has a threaded hole 14 defined on a bottom end thereof, and the first connecting face 11 has an insertion orifice 15 formed on a central position thereof. Each positioning block 2 is an elongated protrusion and includes a tapered affix portion 21 corresponding to each tapered fixing slot 13. Each positioning block 2 also includes a fixation portion 22 opposite to the tapered affix portion 21. The fixation portion 22 has two symmetrical contacting faces 221 defined on two sides thereof and has two flexible portions defined in the two symmetrical contacting faces 221. In the first embodiment, each flexible portion is two symmetrically elongated recesses 222. Each elongated recess 222 has a closed end away from the tapered affix portion 21 and has an open end extending outwardly and adjacent to the tapered affix portion 21. The two symmetrical contacting faces 221 flexibly press and deform inward by ways of the two symmetrically elongated recesses 222.

Each positioning block 2 further includes a mounting hole or blind aperture 23 defined on a middle section thereof and passing through the tapered affix portion 21 from the fixation portion 22. A screw bolt 24 is screwed with the threaded hole 14 of each tapered fixing slot 13 of the base 1 via the mounting hole or blind aperture 23, and the tapered affix portion 21 of each positioning block 2 enters into and contacts with each tapered fixing slot 13 of the base 1. The workpiece holder 3 is connected with or removed from the base 1 and includes a second connecting face 31 on which plural second fixing faces 32 and plural locating slots 33 are arranged. Each locating slot 33 has two side faces 331 and has two symmetrically tilted guiding faces 332 defined on two sides of an opening end thereof and connecting with the two side faces 331. The second connecting face 31 has a column 34 fixed on a central position thereof. When the workpiece holder 3 is connected with the base 1, the column 34 of the workpiece holder 3 is inserted into the insertion orifice 15 of the base 1, the plural second fixing faces 32 of the workpiece holder 3 contact with the plural first fixing faces 12 of the base 1, and each locating slot 33 of the workpiece holder 3 engages with the fixation portion 22 of each positioning block 2 on the base 1. Hence, the two symmetrical contacting faces 221 of the fixation portion 22 of each positioning block 2 engage with the two symmetrically tilted guiding faces 332 and the two side faces 331 of each locating slot 33 of the workpiece holder 3, thus fixing the positioning structure accurately.

Figure 1:
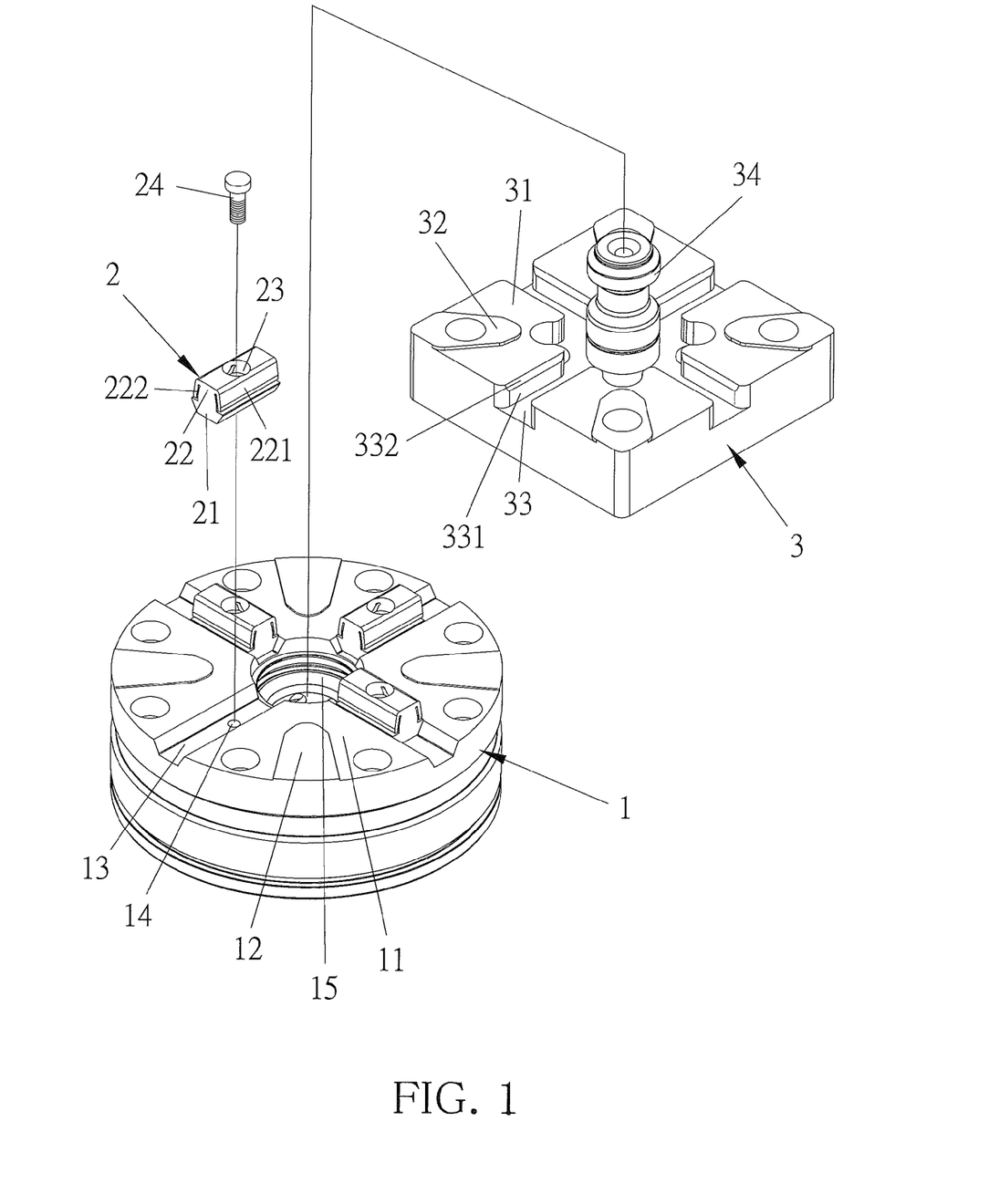
FIG. 1 is a perspective view showing the exploded components of a machining fixture according to a first embodiment of the present invention.
Figure 2:
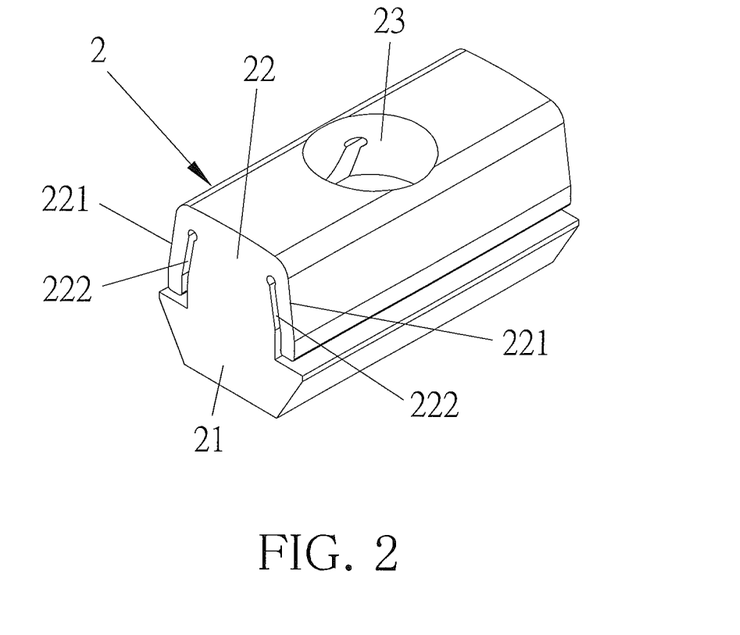
FIG. 2 is a perspective view showing the assembly of a positioning block of the machining fixture according to the first embodiment of the present invention.
Figure 3:
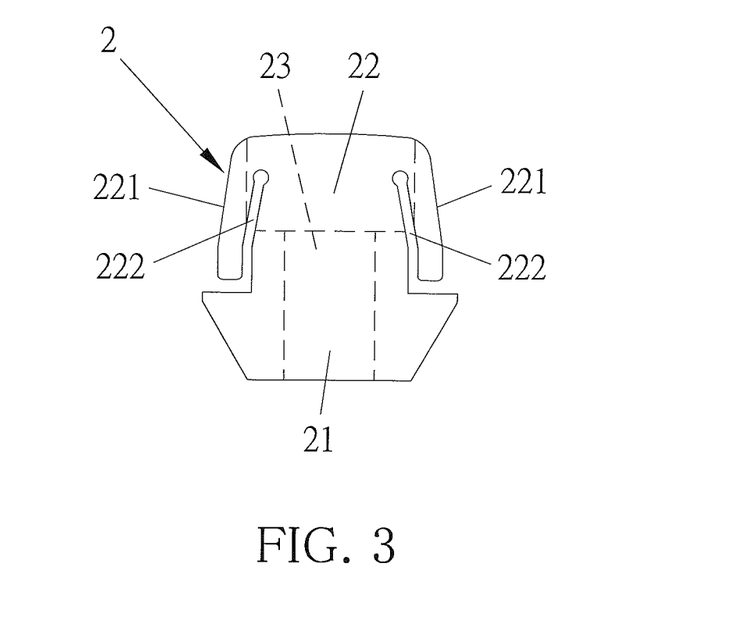
FIG. 3 is a side plan view showing the assembly of the positioning block of the machining fixture according to the first embodiment of the present invention.
Figure 4:
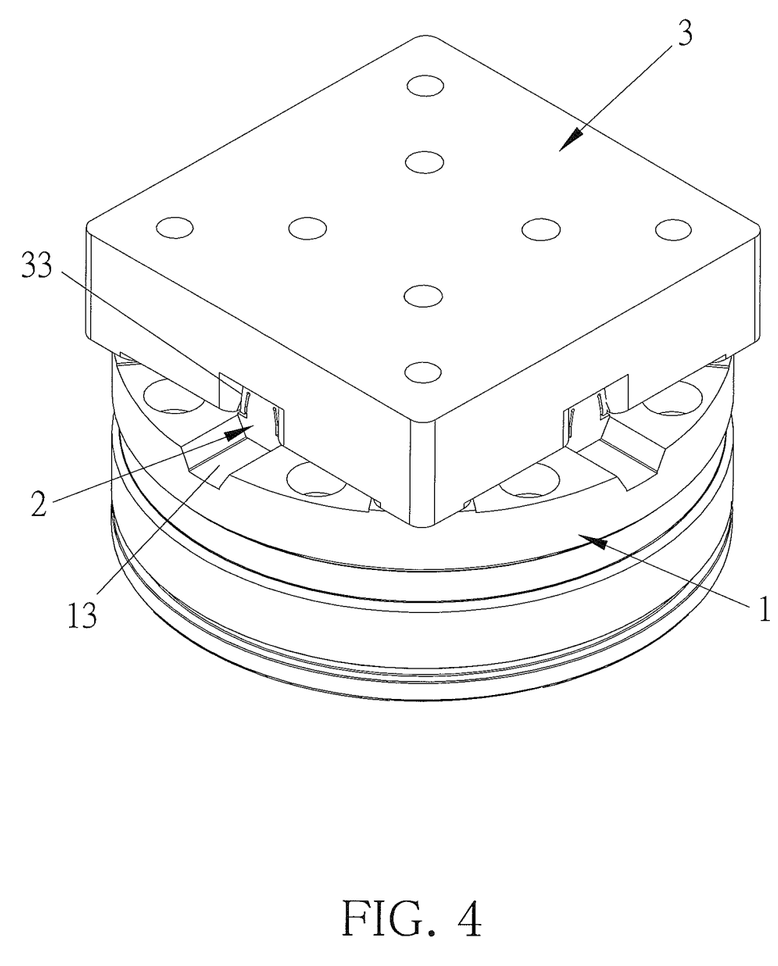
FIG. 4 is a perspective view showing the assembly of the machining fixture according to the first embodiment of the present invention.
Figure 5:
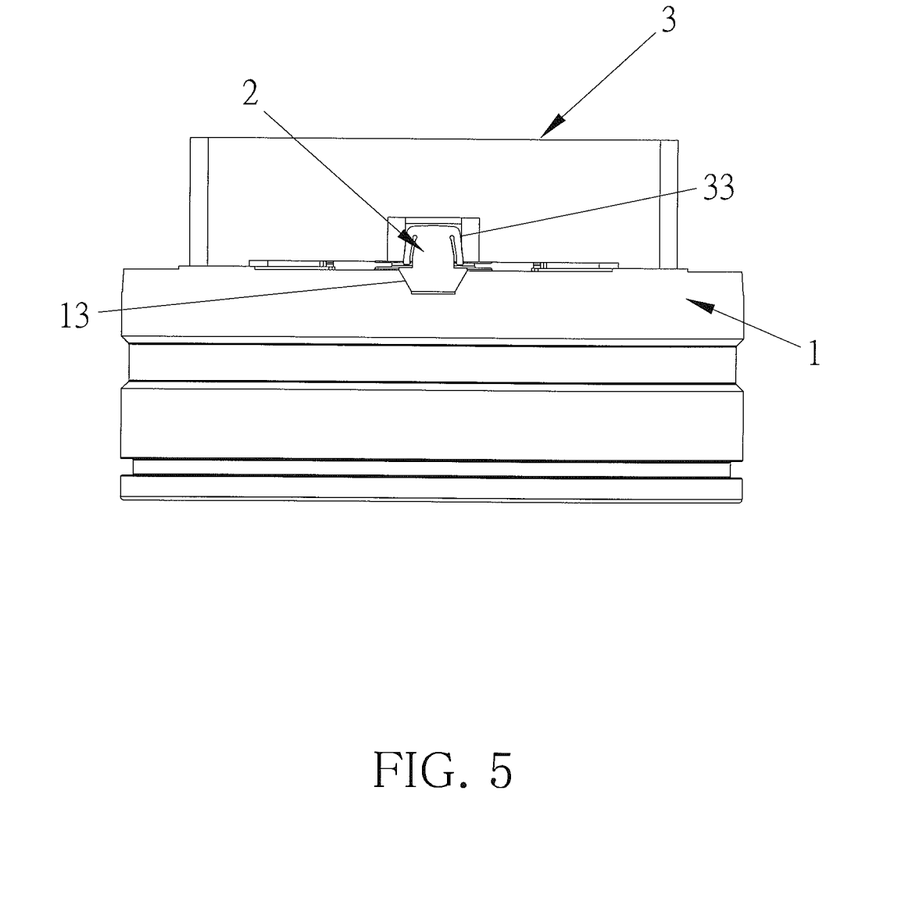
FIG. 5 is a side plan view showing the assembly of the machining fixture according to the first embodiment of the present invention.
Figure 6:
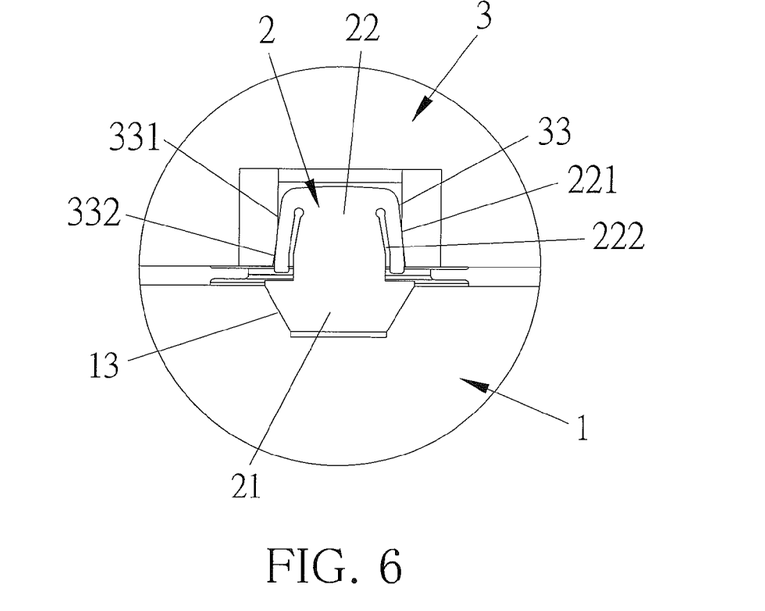
FIG. 6 is an amplified side plan view showing the assembly of a part of the machining fixture according to the first embodiment of the present invention.
Figure 7:
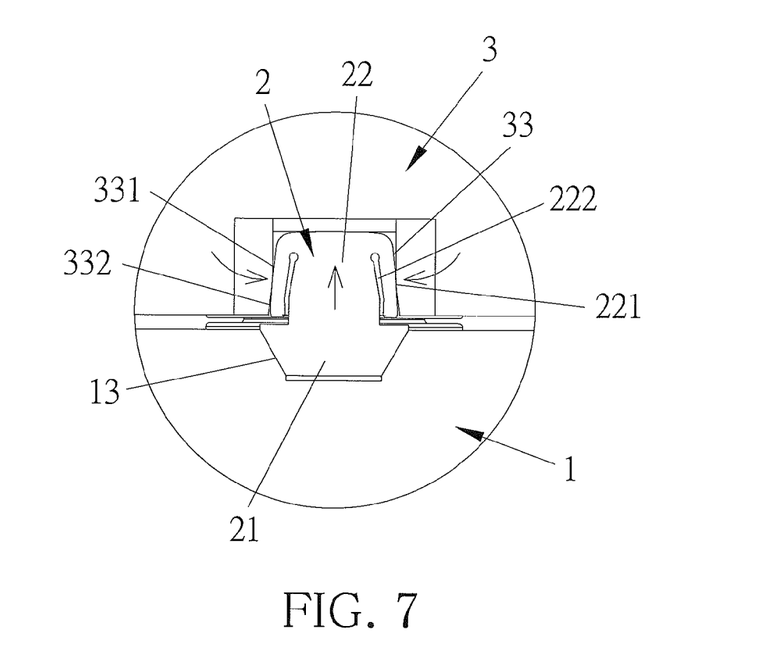
FIG. 7 is a side plan view showing the operation of the machining fixture according to the first embodiment of the present invention.

Thereby, when the plural first fixing faces 12 of the base 1 and the plural second fixing faces 32 of the workpiece holder 3 are broken or worn in a machining process, they are trimmed flatly, so a height of each first fixing face 12 of the base 1 and each second fixing face 32 of the workpiece holder 3 decreases, as shown in FIG. 7. The two symmetrical contacting faces 221 of the fixation portion 22 of each positioning block 2 flexibly press and deform inward, and the fixation portion 22 of each positioning block 2 moves into each locating slot 33 of the workpiece holder 3 to offset the height of each first fixing face 12 of the base 1 and each second fixing face 32 of the workpiece holder 3 which decreases. Hence, a gap between each second fixing face 32 of the workpiece holder 3 and each first fixing face 12 of the base 1 is avoided, thus fixing the workpiece holder 3 with the base 1 accurately to enhance machining precision and to prolong a lifespan of the machining fixture.

Furthermore, when environmental factors (such as temperature change, various machines, and machining error) occur to cause a positioning error between the workpiece holder 3 and the base 1, the two symmetrical contacting faces 221 of the fixation portion 22 of each positioning block 2 flexibly press and deform inward to automatically adjust an engaging depth between each positioning block 2 and each locating slot 33 of the workpiece holder 3, thus obtaining positioning precision and machining accuracy of machine and prolonging the lifespan of machining fixture.

Figure 8:
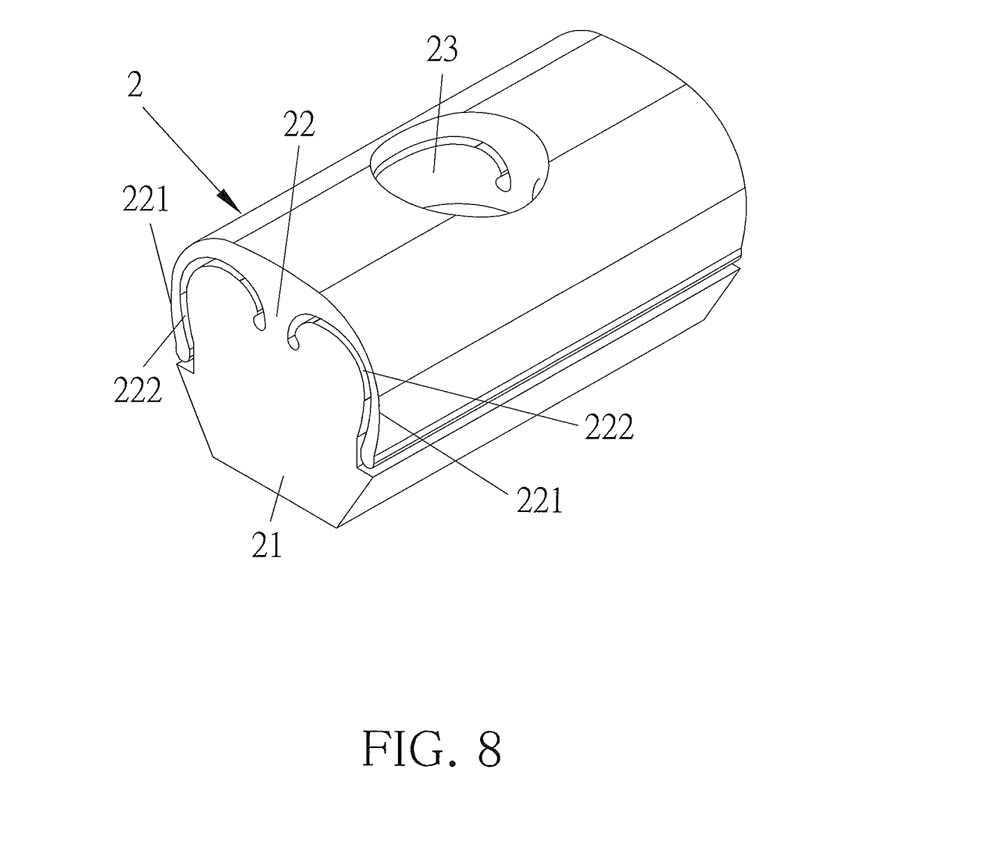
FIG. 8 is a perspective view showing the assembly of a positioning block of a machining fixture according to a second embodiment of the present invention.

In the first embodiment, each flexible portion is the two symmetrically elongated recesses 222, and each elongated recess 222 has the closed end and the open end. In a second embodiment, as shown in FIG. 8, each flexible portion is two symmetrically curved recesses 222, and each elongated recess 222 has a closed end away from the tapered affix portion 21 and has an open end extending outwardly toward the two symmetrical contacting faces 221 and adjacent to the tapered affix portion 21, such that the two symmetrical contacting faces 221 of the fixation portion 22 of each positioning block 2 flexibly press and deform inward by ways of the two symmetrically curved recesses 222.

Figure 9:
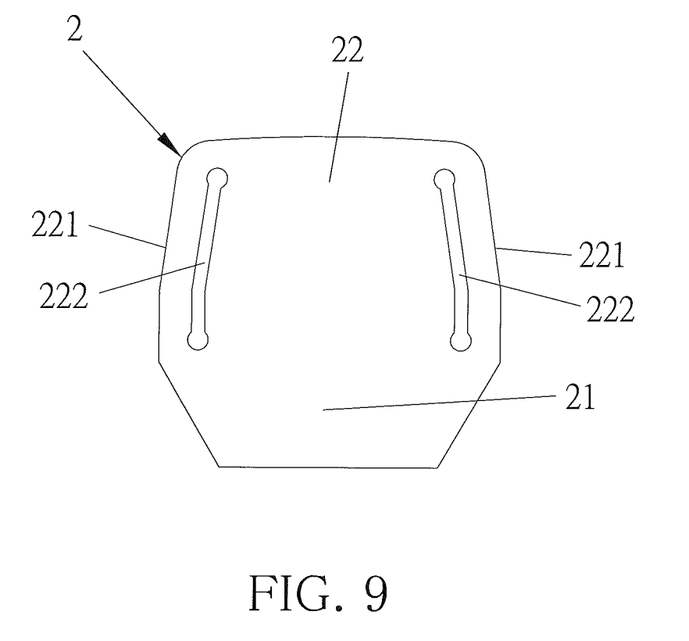
FIG. 9 is a side plan view showing the assembly of a positioning block of a machining fixture according to a third embodiment of the present invention.

In the first embodiment, each flexible portion is the two symmetrically elongated recesses 222, and each elongated recess 222 has the closed end and the open end. In a third embodiment, as shown in FIG. 9, each flexible portion is two symmetrically elongated recesses 222, and each elongated recess 222 has two closed ends, such that the two symmetrical contacting faces 221 of the fixation portion 22 of each positioning block 2 flexibly press and deform inward by ways of the two symmetrically elongated recesses 222.

Figure 10:
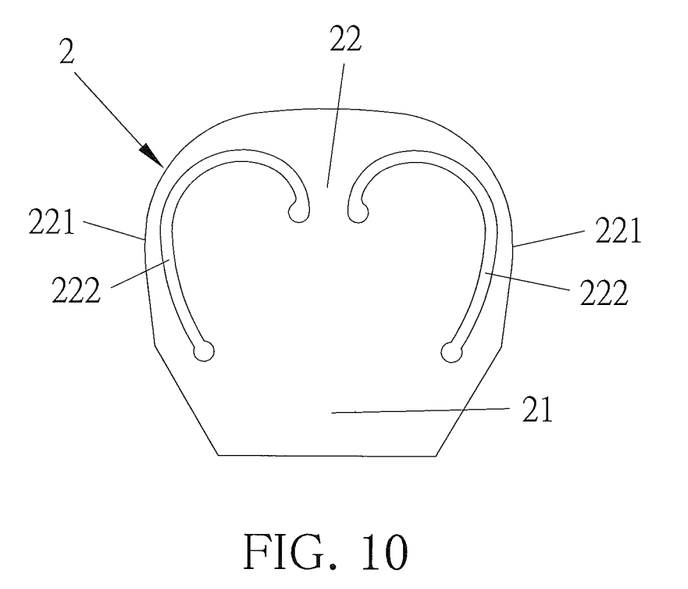
FIG. 10 is a side plan view showing the assembly of a positioning block of a machining fixture according to a fourth embodiment of the present invention.

In the first embodiment, each flexible portion is the two symmetrically elongated recesses 222, and each elongated recess 222 has the closed end and the open end. In a fourth embodiment, as shown in FIG. 10, each flexible portion is two symmetrically curved recesses 222, and each curved recess 222 has two closed ends, such that the two symmetrical contacting faces 221 of the fixation portion 22 of each positioning block 2 flexibly press and deform inward by ways of the two symmetrically curved recesses 222.

While various embodiments in accordance with the present invention have been shown and described, it is clear to those skilled in the art that further embodiments may be made without departing from the scope of the present invention.

What is claimed is:

1. A machining fixture comprising:
    a base including a first connecting face on which plural fixing slots are arranged, wherein each fixing slot has tapered sidewalls and a bottom face, the bottom face containing a threaded hole;
    a plurality of positioning blocks, with each positioning block being an elongated protrusion and including a tapered affix portion and a fixation portion opposite to the tapered affix portion, wherein the tapered affix portion comprises tapered faces, wherein each positioning block further includes a mounting hole located on a middle section thereof and passing through the tapered affix portion from the fixation portion, wherein the tapered faces of each positioning block are engaged with the tapered sidewalls of each fixing slot and each positioning block is secured to the base with a screw through the mounting hole and engaged with the threaded hole, wherein the fixation portion has at least two symmetrically elongated recesses that are positioned and shaped to flexibly support at least two symmetrical contacting faces allowing the symmetrical contacting faces to deflect and deform relative to the affix portion,
    a workpiece holder including a second connecting face on which plural locating slots are arranged, wherein when the workpiece holder is connected with the base, each locating slot engages with the fixation portion of each positioning block on the base by pressing and deforming the two symmetrical contacting faces of each positioning block to accurately fix the position of the workpiece holder relative to the base.

2. The machining fixture as claimed in claim 1, wherein the two symmetrically elongated recesses are two symmetrically arcuate recesses.

3. The machining fixture as claimed in claim 2, wherein each symmetrically elongated recess has a closed end away from the tapered affix portion and has an open end extending outwardly and adjacent to the tapered affix portion.

4. The machining fixture as claimed in claim 2, wherein each symmetrically elongated recess has two closed ends.

5. The machining fixture as claimed in claim 1, wherein each locating slot has two side faces and has two symmetrically tilted guiding faces defined on two sides of an opening end thereof and connecting with the two side faces.

6. A positioning block structure for a machining fixture configured to locate a workpiece holder on to of a base comprising a plurality of positioning blocks, with each positioning block being an elongated protrusion and including a tapered affix portion and a fixation portion opposite to the tapered affix portion, wherein the tapered affix portion comprises tapered faces for positioning the block on a base, wherein each positioning block further includes a mounting hole located on a middle section thereof and passing through the tapered affix portion from the fixation portion,
    wherein the fixation portion has at least two symmetrically elongated recesses that are positioned and shaped to flexibly support at least two symmetrical contacting faces allowing the symmetrical contacting faces to deflect and deform relative to the affix portion to align the positioning block inside a slot on the bottom of the workpiece holder.

7. The machining fixture as claimed in claim 6, wherein the two symmetrical recesses are two symmetrically curved recesses.

* * * * *